United States Patent Office 3,503,943
Patented Mar. 31, 1970

3,503,943
SILANE MODIFIED ETHYLENE-PROPYLENE TERPOLYMER
Edward N. Kresge, Elizabeth, and Charles P. O'Farrell, Roselle, N.J., assignors to Esso Research and Engineering Company, a corporation of Delaware
No Drawing. Filed Oct. 21, 1965, Ser. No. 500,176
Int. Cl. C08f 27/00
U.S. Cl. 260—80.78        14 Claims

ABSTRACT OF THE DISCLOSURE

Moisture curable compositions and method of making same which comprises grafting a silane onto an ethylene, propylene, non-conjugated diene polymer.

---

This invention relates to novel moisture curable polymers and the method of producing them. More specifically, it relates to moisture curable materials made by grafting selected silanes on to a polymeric backbone.

It is known in the art to polymerize silanes with other monomers to produce moisture curable materials. See for example copending application No. 409,308, filed Nov. 5, 1964, now Patent No. 3,375,236. By previous processes a silane was copolymerized with other monomers in a batch type process to form a product which cures in the presence of moisture ($H_2O$).

It has now been found that moisture curable polymers may be formed by grafting selected silane monomeric compounds on to the backbone of unsaturated polymers. This forms what may be termed a graft copolymer, or an adduct of the basic polymeric backbone. The products of this invention are useful in all applications for which moisture curable rubbery or mastic materials are desired. They are particularly suitable, for example, as ditch and reservoir liners, since they can be inexpensively sprayed on to a surface to be coated, and after the solvent has evaporated the polymer is cured by atmospheric moisture to provide a waterproof, weather-resistant liner. In particular, the materials of the present invention are prepared by contacting selected polymers with appropriate silane compounds in the presence of a catalytic amount of a free radical initiator. The resulting product is then cured by exposure to minor amounts of $H_2O$ in the form, for example, of atmospheric moisture or steam.

A wide variety of polymeric materials are useful in the present invention. These may be unsaturated elastomers or polymeric mastics having a viscosity of at least 5,000 centipoises. It is necessary that the backbone polymer have at least about 1% unsaturation, and it is preferred that the unsaturation be external to the polymeric chain; i.e., a pendant double bond or a double bond in a cycloaliphatic ring. Suitable examples of polymeric materials which are useful in this invention include: polybutadiene, natural rubber, dehydrohalogenated ethylene-propylene elastomers, butyl rubber, ethylene-propylene terpolymers, polyisoprene, polychloroprene, styrene-butadiene copolymer, acrylonitrile butadiene copolymer, and polypiperylene.

A particularly preferred polymer which is useful in this invention is a terpolymer of ethylene, propylene, and a small quantity, i.e., about 0.5–20 wt. percent, preferably about 1–5 wt. percent of a non-conjugated diolefin such as 5-methylene norbornene, dicyclopentadiene, and 1,4-hexadiene. Methods of preparing such terpolymers are now well known in the art. Specifically, U.S. Patents Nos. 3,000,866; 3,093,621; and 2,933,480 disclose methods for the synthesis of these polymers and their teachings are incorporated herein by reference.

The ethylene-propylene terpolymers described above may also be grafted with acrylonitrile before being reacted with the silanes of this invention. The presence of the acrylonitrile in addition to the silanes produces moisture-curable polymers with especially high gum tensile strengths.

The backbone polymers of this invention are a solid or semisolid substance comprising at least 50 monomer units per macromolecule. The viscosity average molecular weight of the backbone polymer can range from a few thousand to five hundred thousand or more.

It is important to note that polymers which are substantially fully saturated are not useful in the present invention. Thus, for example, Vistanex (a homopolymer of isobutylene), polyethylene, polypropylene and ethylene-propylene copolymers have no utility in the present process.

The silanes which are useful in this invention are hydrolyzable silanes having the empirical formula:

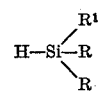

In this formula R is selected from the following groups:
(a) $C_1$–$C_{12}$ hydrocarbyl radicals, preferably $C_1$–$C_6$ hydrocarbyl radicals. Hydrocarbyl radicals include alkyl, cycloalkyl, alicyclic, and acyclic groups; preferred are alkyl groups. Specific examples of these $C_1$–$C_{12}$ hydrocarbyls include methyl, ethyl, propyl, butyl, isopropyl, t-butyl and octyl.
(b) Hydrogen.
(c) A halogen, such as chlorine, bromine, or iodine; preferred is chlorine.
(d) A $C_1$–$C_4$ alkoxy radical. Specific examples of these alkoxy radicals include methoxy, ethoxy, propoxy, and butoxy. Preferred is ethoxy.
(e) A $C_1$–$C_6$ acyloxy radical. Examples of these acyloxy radicals include acetoxy, benzoyloxy, and butryloxy. Preferred is acetoxy. R' in the above empirical formula is selected from any of the above classes c, d, or e (i.e., a halogen, an alkoxy, or an acyloxy, as defined above).

Preferably, at least one R, in addition to the R', is selected from halogen, alkoxy, and acyloxy radicals as defined above. More preferably, both R's are so selected. The most preferred compound is trichlorosilane.

Silanes which do not correspond to the above formula are not operative in the present invention; for example, it has been found that allyl trichlorosilane and vinyl trichlorosilane have no utility.

Any of the known free radical initiators may be used as a catalyst in the process of this invention. A convenient compendium of known free radical initiators is found in "Free Radicals In Solution" (1957), by Cheves Walling.

Suitable free radical initiators include azo compounds such as azobisisobutyronitrile and azobis-α-phenylpropionitrile; organic peroxides such as benzoylperoxide and di-t-butylperoxide; organic hydroperoxides such as cumene hydroperoxide and t-butylhydroperoxide; azides such as benzenesulfonylazide and phenylazide; peresters such as t-butylperbenzoate; and disulfides such as dibenzoyldisulfide and tetramethylthiuram disulfide. Also suitable are gamma radiation and ultraviolet light. The preferred free radical initiator is azobisisobutyronitrile. It is notable that the catalytic effect of the free radical initiator is not similar to the results which are achieved by the use of catalysts which have been heretofore known in the prior art; for example, chloroplatinic acid, which is known to be useful in the grafting of certain kinds of silanes to rubber has no utility in the present invention.

A wide variety of compounding agents may be incorporated with the graft copolymers prepared by this invention in order to improve or alter their physical properties.

Thus, the graft copolymers may be loaded with up to 500 parts by weight of carbon black, preferably about 50 to 200 parts, in order to increase the stiffness or tensile strength. Preferred carbon blacks are those that contain a low concentration of volatile matter such as graphitized ISAF black. The carbon black may also be added after the copolymer has been reacted with the silane.

Other compounding agents well known in the elastomer art such as talc and titanium dioxide may also be added. Additionally, the graft copolymers may be oil extended with such materials such as paraffinic, aromatic, and napthenic oils, or esters such as diisodecylphthalate. Additionally, it has been found desirable in certain instances to blend the backbone polymer with bright stock prior to treatment with the silanes. Between about 5 and 300 wt. percent of bright stock may be blended with backbone polymer although preferably about 50 to 150 wt. percent can be used. Bright stock is known in the art to be a high viscosity lubricating oil obtained from residues of petroleum distillation by dewaxing and treatment with fuller's earth, or a similar material.

The reaction may be carried out at a wide variety of temperatures. Suitably, the temperature range may be between about 20 to 200° C., although it is preferred that the temperature of the reaction be just below the decomposition temperature of the free radical initiator. The reaction may be carried out at low pressures so long as the pressure is sufficient to keep the silane in a liquid phase; however, higher pressures ranging up to about 1000 p.s.i. may be employed if desired. Reaction time may vary between about 1 and 18 hours. Parameters for the reaction temperature, pressure, and time, may be readily determined by routine experimentation.

The graft copolymer (polymer adduct) is conveniently prepared in a liquid phase; i.e., in an inert diluent. Suitable diluents include chlorobenzene, isooctane, benzene, n-heptane, and n-hexane. Suitably, n-hexane is used. The graft copolymer which is produced in this invention may be cured directly from the cement stage, i.e., in the organic diluent, or it may be converted into a latex prior to curing.

The graft copolymer produced in this invention is readily cured by exposure to atmospheric moisture, or in the alternative, the curing process may be accelerated by exposing the copolymer to steam. The copolymer prior to curing may conveniently be sprayed over a surface to be coated and then cured to a tough, resilient, waterproof protective layer.

The invention may be more readily understood by reference to the following data:

EXAMPLE 1

In this example, a 50 g. sample of ethylene-propylene terpolymer, inherent viscosity in decalin=2.5 dl./g., containing 55 wt. percent ethylene and 2.76 wt. percent 2-methylene-5-norbornene was dissolved in one liter of n-heptane, placed in a reaction vessel and flushed with nitrogen for one hour. 5.3 g. of trichlorosilane and 0.3 g. of azobisisobutyronitrile was added, and the reaction vessel was sealed. After 72 hours at 80° C., the reaction mixture was cooled. A sample of the reaction mixture was exposed to moist air and upon evaporation of the solvent formed a tough rubbery material. Extraction of a portion of this material for three days at room temperature with n-hexane showed that the material was 70% gel; proving the polymer was crosslinked. The inherent viscosity of a sample of the modified polymer that had not been reacted with moisture was found to be 2.0 dl./g., proving that no crosslinking occurred during the reaction prior to contact with moisture.

EXAMPLE 2

The silane modified ethylene propylene terpolymer of Example 1 was reacted with butyl lithium in n-heptane solution in the absence of moisture for one hour at room temperature. 1.5 moles of butyl lithium was used for every mole of chlorine on the silane modified polymer. The products of this reaction are lithium chloride and butyl radicals attached to the silicone atoms on the polymer chain. On contact with moist air or steam, the reacted sample remained completely soluble in n-heptane. This shows that the crosslinking is taking place at the Si-Cl group.

EXAMPLES 3–11

In the examples set forth in tabular form in Table I, the reaction procedures described in Example 1 were used with the variations as noted. All the reactions were carried out at 80° C. and the products were cured by exposing them to moist air or steam for 1 to 18 hours. Table II describes the polymers used in the reactions.

TABLE I

| Example | Polymer | Solvent, ml. | Silane, ml. | Initiator, g. | Reaction Time, hrs. | Result, percent Insoluble |
|---|---|---|---|---|---|---|
| 3 | Ethylene-propylene-2-methylene-5-norbornene, 50. | n-Hexane, 1,000 | HSiCl₃, 4.0 | ABN,ᵃ 0.5 | 72 | ᶜ 80 |
| 4 | do | n-Heptane, 1,000 | HSi(OEt)₃, 4.0 | ABN, 0.5 | 48 | ᶜ 71 |
| 5 | do | do | HSi(O—C(=O)—CH₃)₃, 20.0 | ABN, 0.5 | 48 | ᶜ 70 |
| 6 | Ethylene-propylene-dicyclopentadiene, 50 | do | HSiCl₃, 4.0 | ABN, 0.5 | 72 | ᶜ 68 |
| 7 | Ethylene-propylene-1-4 hexadiene, 50 | do | HSiCl₃, 4.0 | ABN, 0.3 | 72 | ᶜ 85 |
| 8 | Polybutadiene, 50 | Benzene, 1,000 | HSi(OEt)₃, 10.0 | BZ₂O₂,ᵇ 0.25 | 18 | ᶜ 92 |
| 9 | do | do | HSiCl₃, 4.0 | ABN, 0.30 | 18 | ᶜ 67 |
| 10 | Bright stock, 100 | n-Heptane, 1,000 | HSiCl₃, 10.0 | ABN, 2.0 | 72 | Gel. |
| 11 | Propylene-oxide, allylglycidalether, 14 | Benzene, 500 | HSiCl₃, 2.0 | ABN, 0.15 | 72 | ᶜ 85 |

ᵃ ABN—Azobisobutyronitrile.  ᵇ BZ₂O₂—Benzoyl peroxide.  ᶜ Cured.

TABLE II

| Ex. | Polymer | Description |
|---|---|---|
| 6 | Ethylene-propylene dycyclopentadiene. | 69 wt. Percent ethylene, 11 wt. percent dicyclopentadiene, inherent viscocity in decalin=2.17 dl/g. |
| 7 | Ethylene-propylene 1-4 hexadiene. | 59 wt. percent ethylene, 3.6 wt. percent 1-4 hexadiene, inherent viscosity in decalin=2.17 dl/g. |
| 8–9 | Polybutadiene | Prepared with butyl lithium in xylene, degree of polymerization=1,000. |
| 11 | Propylene-oxide, allylglycidalether. | 3 wt. percent allylglycidalether. |

EXAMPLE 12

50 g. of ethylene-propylene-2-methylene-5-norbornene and 50 g. of bright stock (MW=1000) were dissolved in n-heptane and flushed with N₂ for one hour. 50 g. of ABN and 15 ml. of trichlorosilane were added. The reaction vessel was sealed and the solution was allowed to reach for 75 hours at 80° C. Upon exposure to steam, a tough rubbery material resulted. Extraction of a portion of this material with n-heptane for four days at room temperature showed that the material was 70.0% gelled. This result shows that the polymer and oil where incorporated into a common cross-linked matrix.

EXAMPLE 13

100 ml. of a 5% silane modified ethylene-propylene-2-methylene-5-norbornene solution prepared as in Example 1 was mixed in a moisture free atmosphere with 50 ml of a 10% silane modified bright stock solution. The mixture was exposed to moist air. The product was extracted with a n-heptane for four days at room temperature and exhibited 60% gel. This further shows that the silane modified oil and silane modified polymer are crosslinking in a common matrix.

EXAMPLE 14

100 g. of ethylene-propylene-2-methylene-5-norbornene and 50 g. of a graphitized ISAF carbon black were mixed on a rubber mill at room temperature. A 75 g. sample of this mixture was disolved in one liter of n-heptane. The solution was placed in a glass reaction vessel and flushed with nitrogen for one hour. 5.0 g. of azobisisobutyronitrile and 10 ml. of trichlorosilane were added and the mixture was heated at 80° C. for 72 hours. The resulting solution was cooled and a sample was exposed to moist air for one day. The film which formed was tested on a Scott tensile testing machine and exhibited a tensile strength of 1210 p.s.i. and an elongation at break of 350%.

Examples 15–20 illustrate conditions and reactants which have no utility in the present invention.

EXAMPLE 15

75 g. of ethylene-propylene-2-methylene-5-norbornene terpolymer, as described in Example 1, was dissolved in 1500 ml. of n-heptane and flushed with nitrogen for one hour. 3.3 ml. of trichlorosilane and 1.5 mg. of chloroplatinic acid was added to the reaction and it was stirred for 18 hours at 75° C. On exposure to moist air or steam for one day, the sample did not crosslink as indicated by complete solubility in n-heptane. This shows that chloroplatinic acid is not a useful catalyst in this invention.

EXAMPLE 16

The reaction was carried out in as Example 15 except 8.8 ml. of trichlorosilane and 5.0 mg. of chloroplatinic acid were used and the reaction was heated at 80° C. for 72 hours. On exposure to steam for 7 hours, the sample did not crosslink as indicated by complete solubility in n-heptane. This again shows that chloroplatinic acid is not an effective catalyst for grafting.

EXAMPLE 17

75 g. of ethylene-propylene-1-4 hexadiene terpolymer as described in Example 7 was reacted with trichlorosilane under the conditions of Example 15. On exposure to steam for 7 hours, the sample was found to be completely soluble in n-heptane. No cross-linking occurred.

EXAMPLE 18

75 g. of ethylene-propylene-1-4 hexadiene terpolymers, as described in Example 7, was reacted with trichlorosilane under the conditions of Example 16. On exposure to steam for 7 hours, the sample was found to be completely soluble in n-heptane. This shows no crosslinking occurred and that chloroplatinic acid has no utility in the present invention.

EXAMPLE 19

A reaction was carried out as described in Example 1, except that vinyl trichlorosilane was used in place of trichlorosilane. After exposure to steam for four hours, the sample was completely soluble in n-heptane. This shows that no crosslinking occurred and that vinyl trichlorosilane is without utility in the present invention.

EXAMPLE 20

A reaction was carried out as described in Example 1, except that an ethylene propylene copolymer containing 58 wt. percent ethylene and having an inherent viscosity in decalin of 2.5 dl./g. was substituted for ethlyene-propylene-2-methylene-5 - norbornene terpolymer. After exposure to steam for four hours, the sample was completely soluble in n-heptane, showing that the saturated copolymer is without utility in the present invention.

This invention has been described in connection with certain specific embodiments thereof; however, it should be understood that these are by way of example rather than by way of limitation, and it is not intended that the invention be restricted thereby.

What is claimed is:
1. A method for producing a water-curable graft copolymer which comprises contacting an unsaturated elastomeric of mastic terpolymer comprising ethylene, propylene, and about 0.5–20 weight percent of a nonconjugated diolefin, with a silane in the presence of a free radical initiator, said silane having the formula

R is selected from the group consisting of hydrogen, a $C_1$–$C_{12}$ hydrocarbyl, a halogen, a $C_1$–$C_4$ alkoxy, or a $C_1$–$C_6$ acyloxy radical; and R' is selected from a halogen, a $C_1$–$C_4$ alkoxy, or a $C_1$–$C_6$ acyloxy radical.

2. The method of claim 1 wherein R and R' are selected from a halogen, a $C_1$–$C_4$ alkoxy or a $C_1$–$C_6$ acyloxy radical.

3. The method of claim 2 wherein the silane is trichlorosilane.

4. The method of claim 1 wherein the polymer is an elastomer.

5. The method of claim 4 wherein the elastomer is a terpolymer of ethylene, propylene and between about 0.1 and 20% by weight ofa nonconjugated diolefin.

6. The method of claim 5 wherein the elastomer is a terpolymer of ethylene, propylene and between about 1 and 5% by weight of methylene norbornene.

7. The method of claim 6 wherein the silane is trichlorosilane.

8. The method of claim 7 wherein the free radical initiator is azobisisobutyronitrile.

9. The method of claim 3 wherein the free radical initiator is azobisisobutyronitrile.

10. A moisture curable composition of matter comprising a backbone of an unsaturated elastomeric or mastic terpolymer comprising ethylene, propylene, and about 0.5–20 weight percent of a nonconjugated diolefin, onto which is grafted a silane of the formula

R is selected from group consisting of hydrogen, a $C_1$–$C_{12}$ hydrocarbyl, a halogen, a $C_1$–$C_4$ alkoxy, or a $C_1$–$C_6$ acyloxy radical; and R' is selected from a halogen, a $C_1$–$C_4$ alkoxy, or a $C_1$–$C_6$ acyloxy radical.

11. The composition of claim 10 which contains 0.5 to 5 wt. percent of silane.

12. The composition of claim 11 wherein the silane is trichlorosilane.

13. The composition of claim 12 wherein the backbone polymer is an elastomeric terpolymer of ethylene, propylene and between about 0.1 and 20 wt. percent of a nonconjugated diolefin.

14. The composition of claim 13 wherein the nonconjugated diolefin is methylene norbornene.

References Cited

UNITED STATES PATENTS

| | | | |
|---|---|---|---|
| 2,475,122 | 7/1949 | Barry | 260—85.1 |
| 2,561,177 | 7/1951 | Barry | 260—85.1 |
| 2,833,749 | 5/1958 | Jones | 260—85.1 |
| 3,375,236 | 3/1968 | Van De Castle | 260—80.71 |
| 3,408,420 | 10/1968 | Wiggill | 260—827 |

OTHER REFERENCES

Arge, C. L.: Journal American Chemical Soc., vol. 71, pp. 300–304 (1949).

JOSEPH L. SCHOFER, Primary Examiner

R. S. BENJAMIN, Assistant Examiner

U.S. Cl. X.R.

260—46.5, 83.3, 85.1, 88.2, 94.7, 768, 824